Figure 1:
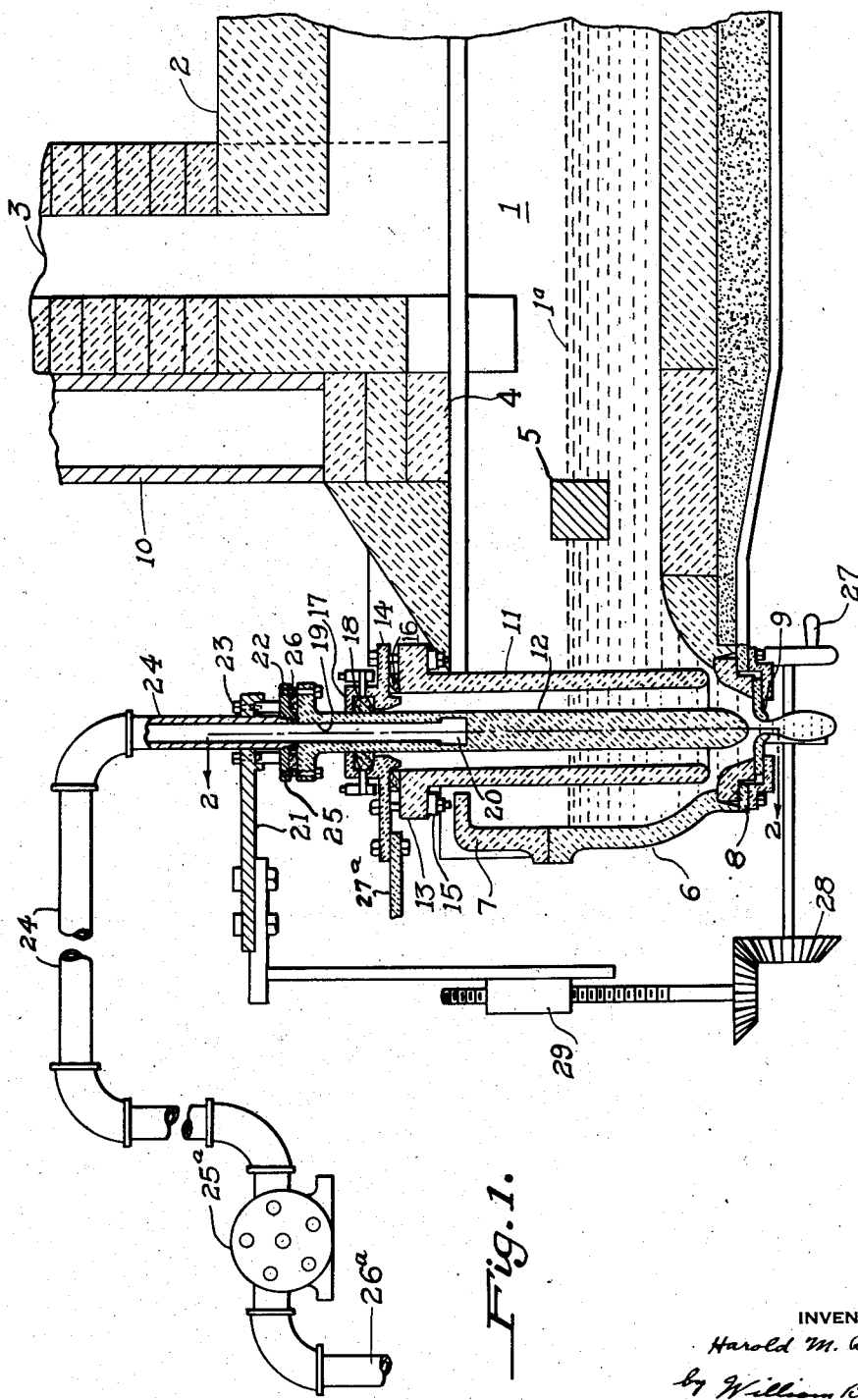

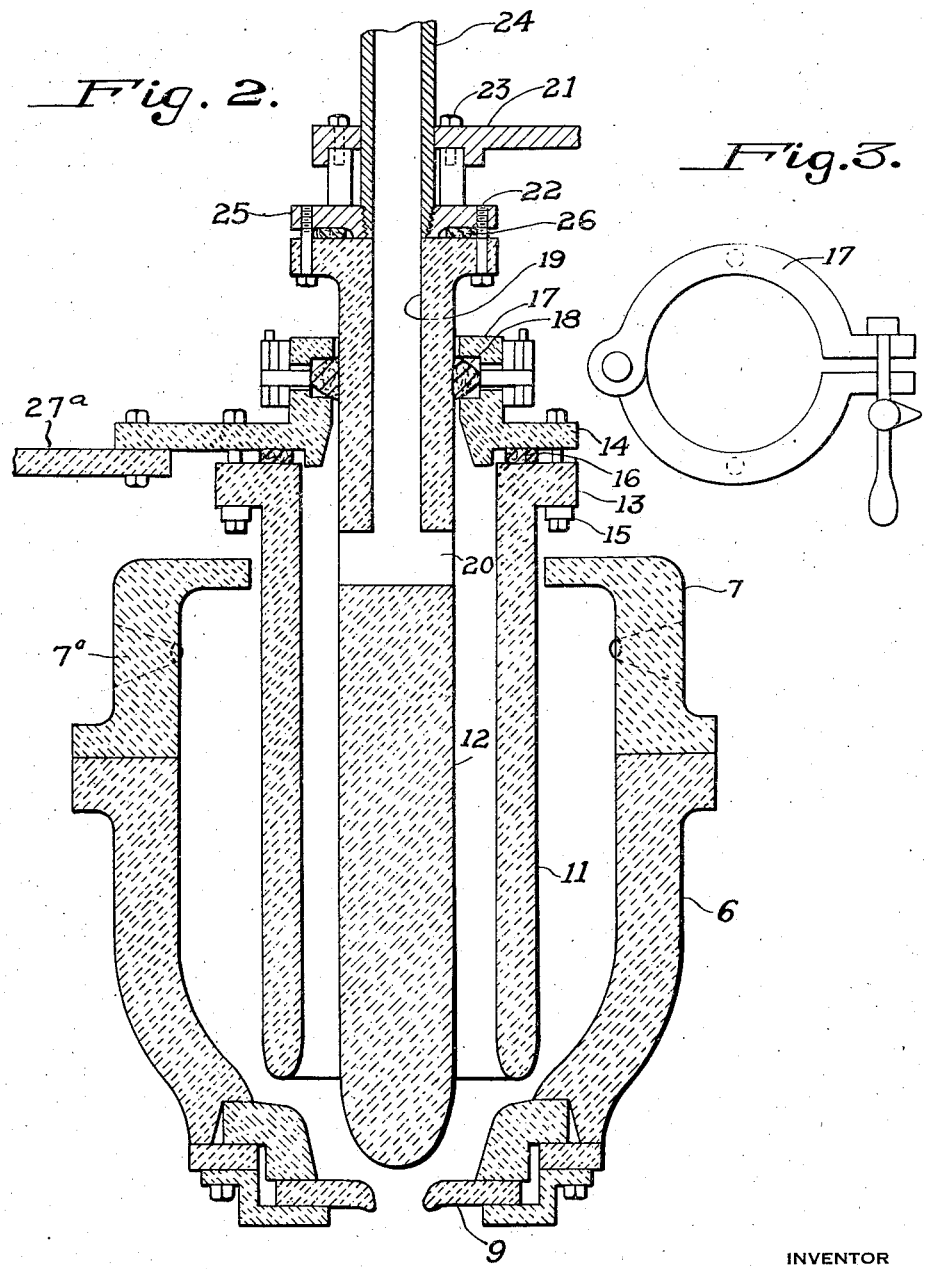

Patented June 28, 1938

2,121,945

UNITED STATES PATENT OFFICE 2,121,945

GLASS FEEDER

Harold M. Black, Jeannette, Pa., assignor to McKee Glass Company, Jeannette, Pa., a corporation of Pennsylvania Application March 26, 1935, Serial No. 13,092

2 Claims. (Cl. 49—55)

This invention relates to new and useful improvements in apparatus and method for feeding charges of molten glass to ware forming machines, and it is among the objects thereof to provide apparatus especially adapted to regulate the weights and sizes of such mold segregates when produced by pneumatic types of feeders.

In the use of pneumatic feeders, it is common to employ a refractory tube or bell which is suspended in the molten glass above a submerged feed orifice, such implement constituting a feed chamber through which positive and negative pressure impulses are applied to the glass above the orifice to regulate the weights and shapes of gobs.

In accordance with the present invention, such refractory tube is employed in combination with a refractory plug, both of which are stationary during the feeding operation and adjustable relative to a flow spout or feed orifice for the purpose of obtaining greater flexibility in the regulation of the gob sizes and shapes, such a device being particularly useful in gravity flow feeders, namely, where no positive pressure is applied to extrude the mold charges or gobs.

The invention will become more apparent from a consideration of the accompanying drawings constituting a part hereof in which like reference characters designate like parts and in which:

Fig. 1 is a vertical section longitudinally of a feeder boot and forehearth structure embodying the principles of this invention;

Fig. 2 a vertical section of the feeding implement taken along the line 2—2, Fig. 1; and Fig. 3 a plan view of a clamping ring for holding the refractory plug in adjusted position.

With reference to Fig. 1 of the drawings, the numeral 1 generally designates a forehearth structure provided with a roof or cover 2 having an exhaust stack 3, a fore-arch 4, a skimmer block 5, and a flow spout 6, the spout 6 being provided with a split cover 7 which also constitutes the burner block having burner ports 7a. A refractory spout bushing 8 is provided at the open end at the bottom of the spout and an orifice ring 9 is clamped thereto. An exhaust stack 10 is provided above the arch 4 to withdraw the products of combustion from the chamber above the glass in the flow spout 6. Disposed through the cover 7 and in alignment with the feed orifice is a refractory sleeve or tube 11 which is more clearly illustrated in Fig. 2 of the drawings and disposed centrally of the tube 11 is a refractory plunger 12. Both the tube 11 and the plunger 12 are adjustably mounted relative to the bushing 8 in the following manner.

Tube 11 is provided with a flange 13 which is secured to a bracket 14 by bolts 15, the bracket being vertically adjustable, an asbestos packing ring 16 being disposed between the tube and bracket to form a sealed joint. The tube 11 is adjustably mounted on a supporting bracket 14 and an asbestos ring 18 contractible by a clamping ring 17 shown in Fig. 3 hermetically seals the inner chamber of tube 11. Plug 12 is solid at the bottom portion and is provided with an air passage 19 at the top thereof, passage 19 terminating in a slotted opening 20 to communicate with the interior of the sleeve or tube 11. The plug 12 is secured to a bracket 21 by clamp bolts 22 and 23 and a conduit 24 is threaded to a flange 25. A packing ring 26 of asbestos is disposed between the ring 25 and top of the plug 12 to provide a sealed joint. The conduit 24 is connected to a valve mechanism 25a, Fig. 1, which is adapted to establish communication with a source of vacuum connected by a pipe line 26a. Bracket 21, supporting the plug 12, is adjustable by a hand wheel 27 through bevel gears 28 and a screw and nut mechansm 29, and bracket 14 and supporting tube 11, may be adjusted by similar mechanism.

The operation of the above described mechanism is briefly as follows: With the forehearth 1 filled with a pool of molten glass, the level of which is designated by the numeral 1a, and which is maintained by communication of the forehearth with a melting chamber (not shown) the glass will fill the lower portion of tube 11 below the slotted opening 20 of the plug 12. By adjusting the height of the tube 11 relative to the spout bushing 8, the flow of glass between the lower extremity of the tube 11 and the top of the spout bushing 8 is regulable, and by adjustment of the plug 12 relative to the feed orifice, the amount of glass flowing out of the orifice is regulable. The glass is permitted to flow by gravity from the feed orifice and is interrupted by the application of vacuum through the line 24 as controlled by the valve mechanism 25a.

When vacuum is applied, the space or chamber within the tube 11 is rarefied and a suction impulse is applied to the glass within the tube and above the feed orifice. At the same time, the glass suspended from the orifice ring 9 is severed and the stub is drawn into the orifice of the ring 9 and spout bushing 8. When the vacuum is subsequently released through valve mechanism 25a, the glass again flows by gravity out of the feed orifice. When the vacuum is applied, glass is drawn through the passage formed by the lower end of tube 11 and the top of spout bushing 8 so that by adjusting the tube 11 relative to the bushing 8, a given head of glass can be established within the tube 11 and this head, in turn, will determine the volume of glass flowing from the feed orifice during the intervals between successive applications of the vacuum.

In addition to this mode of regulating the quantity of glass flow from the feed orifice, the plug 12 may be adjusted by releasing clamp 17 which loosens the packing 18 from around the plug 12 and permits vertical adjustment through the wheel 27. By means of the adjustments of the tube and plug 11 and 12, respectively, all variable conditions of glass viscosity, which is largely a matter of its thermal condition, can be provided for to maintain continuous operation of the feeder and weight and size of the mold charge. The temperature of the glass in the flow spout is regulated by burners extending through the burner ports 7a of the split cover 7, and by operating dampers on stacks 3 and 10, the application of the burner flame to the front or back of the spout chamber can be regulated.

Valve mechanism 25a controlling the intermittent application of vacuum to the glass is operated in synchronism with the movements of the ware forming machine that carries the molds for receiving the feed charges or gobs from beneath the feeding orifice, this timing mechanism being of conventional form and constitutes no part of the present invention.

While the apparatus has been described as particularly adapted for use where no positive pressure impulses are applied to the glass, it is apparent that the relative adjustable sleeve and plug may be employed on pneumatic feeders utilizing negative and positive impulses.

Although one embodiment of the invention has been illustrated and described, it will be apparent to those skilled in the art that various modifications may be made in the details of construction without departing from the principles herein set forth.

I claim:

1. Apparatus for feeding segregated mold charges from a source of molten glass comprising a feed chamber having a feed orifice, a refractory sleeve submerged in the glass above the feed orifice and being adjustable relative to the walls of the chamber to form a regulable flow passage and a refractory plunger extending through and beyond said sleeve into the feed chamber to control the rate of flow of glass from said feed orifice, said plunger being solid at its lower portion and hollow at the top thereof, the hollow portion communicating through an opening of the plug with the space between the plunger and sleeve member and a source of negative pressure communicating with the hollow portion of the plug to determine the amount of head pressure effective on the glass in said feed orifice.

2. Apparatus for feeding segregated mold charges from a pool of molten glass comprising a feed chamber having a submerged feeding orifice, a refractory sleeve in alignment with said feed orifice, and a refractory plug within said sleeve extending below the end thereof in register with said feed orifice to control the flow of glass through said orifice, a bracket for supporting said sleeve and a packing material for hermetically sealing the bracket and the top of the sleeve, said bracket being adjustable vertically, a packing gland interposed between the refractory plug and sleeve bracket to permit independent vertical adjustment of said plug, said plug being solid at the lower end thereof, and hollow at the top, and having an opening communicating with the inner chamber of said sleeve and said hollow portion of the plug being further communicative with a source of vacuum whereby the quantity of glass in the refractory sleeve is regulated to control the head pressure of the glass above the feed orifice.

HAROLD M. BLACK.